Figure 1:
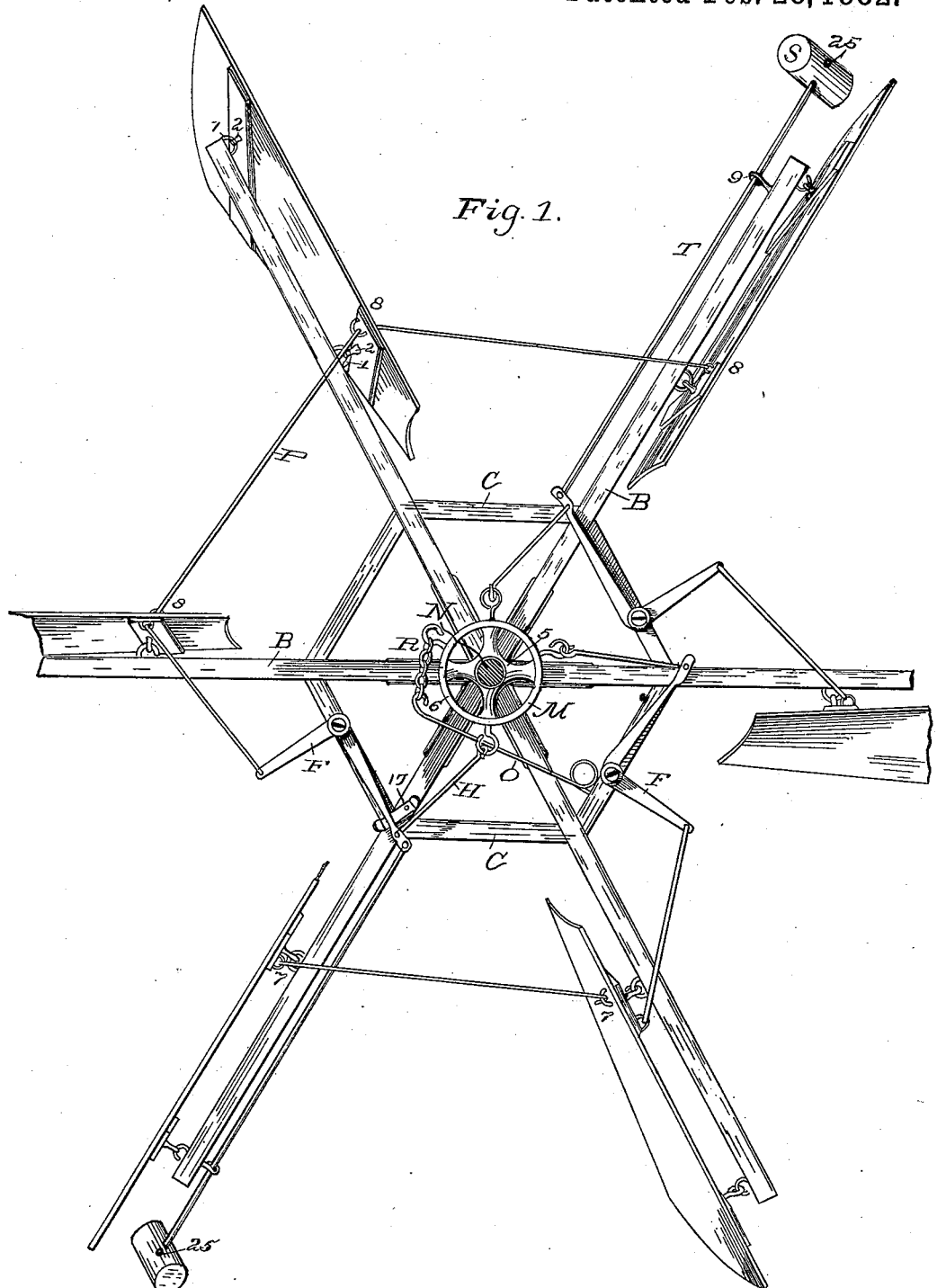

(No Model.)

S. D. STRAW & A. J. SIGNOR.
WINDMILL.

No. 254,405.

2 Sheets—Sheet 1.

Patented Feb. 28, 1882.

WITNESSES

INVENTOR
Samuel D. Straw
Alfred J. Signor
by Ellis Spear
Attorney (No Model.) 2 Sheets—Sheet 2.
S. D. STRAW & A. J. SIGNOR.
WINDMILL.
No. 254,405. Patented Feb. 28, 1882.
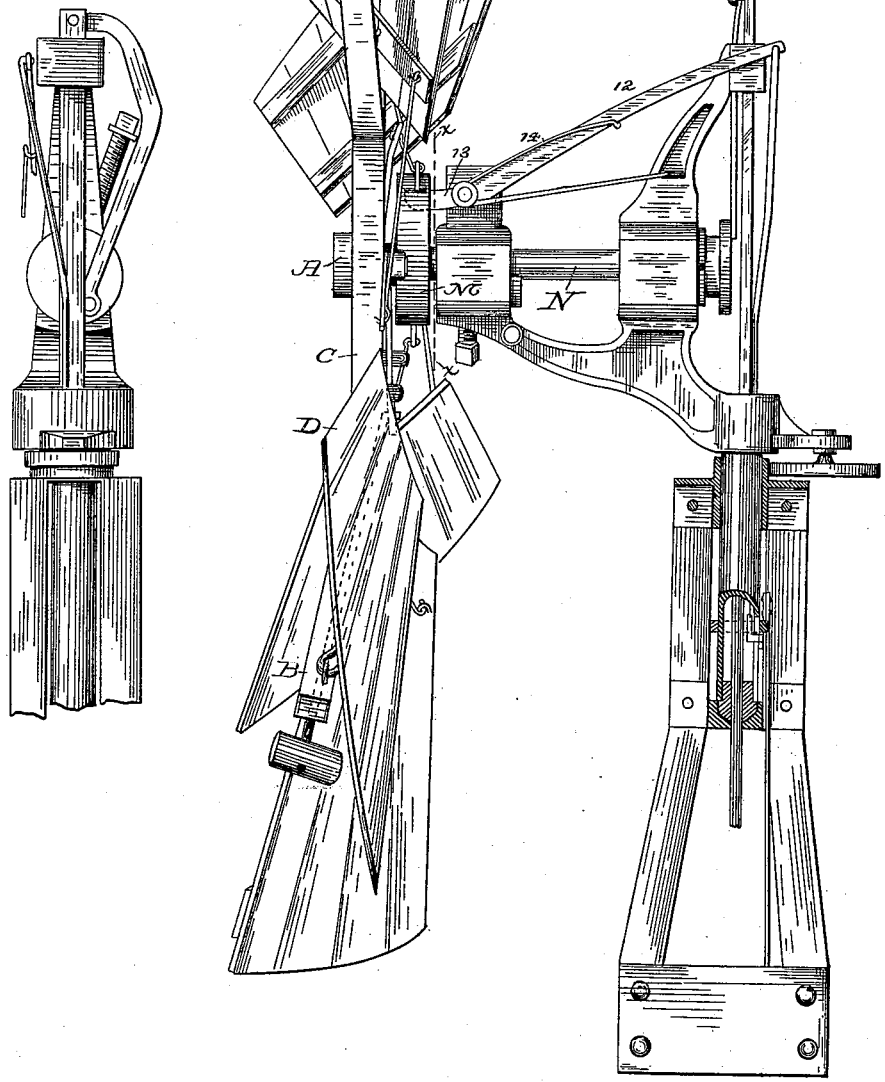
WITNESSES
INVENTOR
Samuel D. Straw
Alfred J. Signor
by Ellis Spear
Attorney

UNITED STATES PATENT OFFICE.

SAMUEL D. STRAW AND ALFRED J. SIGNOR, OF ELKHART, INDIANA; SAID SIGNOR ASSIGNOR TO ORVILLE T. CHAMBERLAIN, OF SAME PLACE.

WINDMILL.

SPECIFICATION forming part of Letters Patent No. 254,405, dated February 28, 1882.

Application filed October 6, 1881. (No model.)

*To all whom it may concern:*

Be it known that we, SAMUEL D. STRAW and ALFRED J. SIGNOR, of Elkhart, in the county of Elkhart and State of Indiana, have invented a new and useful Improvement in Windmills; and we do hereby declare that the following is a full, clear, and exact description of the same.

Our invention relates to windmills of the class known as "vertical" windmills, and to certain improvements upon Letters Patent bearing date June 28, 1881, numbered 243,508, granted to us and Orville T. Chamberlain. In that patent was shown a wind-wheel composed of fan-sections pivoted off their centers for automatic adjustment to varying wind-pressure, in combination with a centrifugal governor connected to a band or circle, to which all the fans were attached, and by the revolution of which such fans were completely and simultaneously thrown out of the wind, and also with a brake mechanism, by which such circle could be operated by force applied externally to effect the same result. In that patent the circle was necessarily attached to a drum sliding on the main shaft, which was extended to permit such motion.

Our invention consists mainly in combining with a series of pivoted fans forming a windwheel a wheel carried by the main shaft and adapted to be revolved independently, one or more bell-crank levers connecting the said wheel and the fans, and a spring for accomplishing the automatic return of the wheel, and consequently the fans, to a normal position; further, in combining with the before-mentioned elements one or more centrifugal governors; further, in the manner of connecting and operating a series of fans simultaneously; and, finally, in the general construction and combination of the various parts, as fully hereinafter explained.

In the drawings, Figure 1 represents a front elevation of the wind-wheel, the main shaft being shown in section on the line $x$ $x$ of Fig. 2. Fig. 2 is a side elevation. Fig. 3 is a view showing the connection of the pump-rod.

The wind-wheel is composed of a hub, A, rigidly secured upon the main shaft N, and provided with sockets or standards, in which are bolted the radial arms B B, which support the fan-sections. Braces C C, secured to the radial arms by dowel-pins, give to the structure the necessary firmness and solidity.

The fan-sections are composed of strips D, bolted closely together to battens E, Fig. 2. One of these fans is attached to each of the radial arms B, as shown in Fig. 1, by means of eyes 1 1 on the arm and eyes 2 2 on the batten. The fan is pivoted off its center in order to expose a greater surface to the wind upon one side of the pivot than upon the other.

Secured to the braces C C are one or more bell-crank levers, F, pivoted at their angle about midway between two of the radial arms B B. These levers form the means for connecting the fan-sections to a wheel, M, on the main shaft, Fig. 2, the wheel M consisting of a hub, 5, fitting closely to and turning with the shaft, but adapted to revolve independently of it, and a circular rim or flange, 6. A pitman, H, is secured at one end to the periphery of the flange 6 by a double eye connection which permits a compound movement, and at the other to the end of one of the bell-cranks. The other end of the bell-crank is connected by a similar connecting-rod to one of the fan-sections on the side presenting less surface to the wind. It will be evident, then, that a revolution of the hub and wheel M will, through the connecting-arms and bell-crank, move the fan-section on its pivots into or out of the wind, as the case may be. This is illustrated in Fig. 1, where a single fan is operated by one bell-crank and connections. We have found, however, that it is practicable to operate a series of two or more fans from a single bell-crank, and in the same figure we have shown the manner in which this is accomplished, the second bell-crank being used to operate two fans and the third to control three. The connection between the fans composing a series is made by a rod, P, having an eye at each end engaging with a corresponding eye upon each of the fans, as shown at 7 7, the result being to move the fans composing the series simultaneously. In the same manner three fans or more may be connected together, as shown at 8 8 8, and moved together by a single bell-crank and connections. The fans are held in a normal position in the wind by means of a spring, O, which is secured to one of the braces C, and connected by a chain, R, to the flange of the wheel M. The tension of this spring (which may be varied by connecting it to different links of the chain) forces the wheel M in one direction as far as is necessary to keep the fans in the wind. An undue increase in the wind-pressure acting on the eccentrically-pivoted fans will force them outward, moving the wheel M around on the shaft and throwing the fans more or less out of the wind, the spring O acting automatically to return them to their former position as the pressure diminishes.

It will be seen that by the use of peculiar double eye connections a freedom of movement in different directions is permitted the connecting-rods, and it is unnecessary for the wheel M to slide longitudinally on the shaft, but simply to turn slightly on its axis. This constitutes an important improvement on our patent before referred to.

In order to provide means for a more complete self-adjustment of the fans, we use the centrifugal governors S. (Shown in Figs. 1 and 2.) These consist of a weighted rod, T, attached to the inner end of the bell-cranks, and extending along the radial arms B through a support, 9. The weight S is adjustable by a set-screw, 25, as shown. In operation the governors act by centrifugal force when the wheel runs too swiftly, and by drawing outward on the bell-cranks and connecting-rods move the wheel M and throw the sails more or less out of the wind. The wheel is under external control by a brake mechanism consisting of a lever, 12, pivoted to the main casting, having a brake-shoe, 13, adapted to bear on the inner periphery of the flange or rim of the wheel M, it being held off such flange when in ordinary position by a spring, 14. This lever is connected with the ground by a cord or wire which passes through the standard of the mill, and is provided with a swivel-connection like that shown in our former patent, to permit such standard to revolve freely. By the operation of the brake the wheel M, which ordinarily revolves with the shaft, is stopped, while the shaft and wind-wheel continue to revolve. The stoppage of the wheel acts on the bell-cranks and throws the fans out of wind, stopping the motion of the wind-wheel. A stop, 17, upon one of the arms B in the path of the bell-crank limits its motion, permitting it to move a distance just sufficient to throw the fans completely into or out of the wind.

It will be understood that our wheel takes wind from the rear, and, being mounted off its bearing-center, requires no tail or rudder vane, but it is self-adjusting to the wind-currents.

Having thus described our invention, we claim—

1. In a windmill, the combination of a series of pivoted fans, a wheel, M, on the main shaft, adapted to be revolved independently of the main shaft, one or more bell-crank levers connected to the wheel M and to the fans, and a spring, O.

2. The combination of the wheel M on the shaft, the spring O, the bell crank, and the connecting-rods having double eye attachment to the wheel and to the fans, as described.

3. The wheel M, carried by the main shaft and adapted to revolve without longitudinal motion on such shaft, in combination with one or more bell-crank levers connected to the pivoted fan-sections and one or more centrifugal governors.

4. The wheel M, in combination with a bell-crank lever and a series of two or more fans connected together and operated simultaneously by the revolution of the wheel M.

5. The wheel M, in combination with a bell-crank lever and a pivoted fan operated through such bell-crank by the revolution of the wheel M.

6. In combination with the wheel M and one or more pivoted fans, the bell-cranks and the connecting-rods attached to the said wheel and fan or fans by a double eye joint composed of two connected rings or hooks, both having a free movement, whereby a universal connecting-joint is formed.

In testimony whereof we have signed our names to this specification in the presence of two subscribing witnesses.

SAMUEL D. STRAW.
ALFRED J. SIGNOR.

Witnesses:
JULIUS D. WOOD,
LIVY CHAMBERLAIN.